Nov. 8, 1932.   J. D. HART   1,887,019
RESILIENT TIRE
Filed Sept. 28, 1931
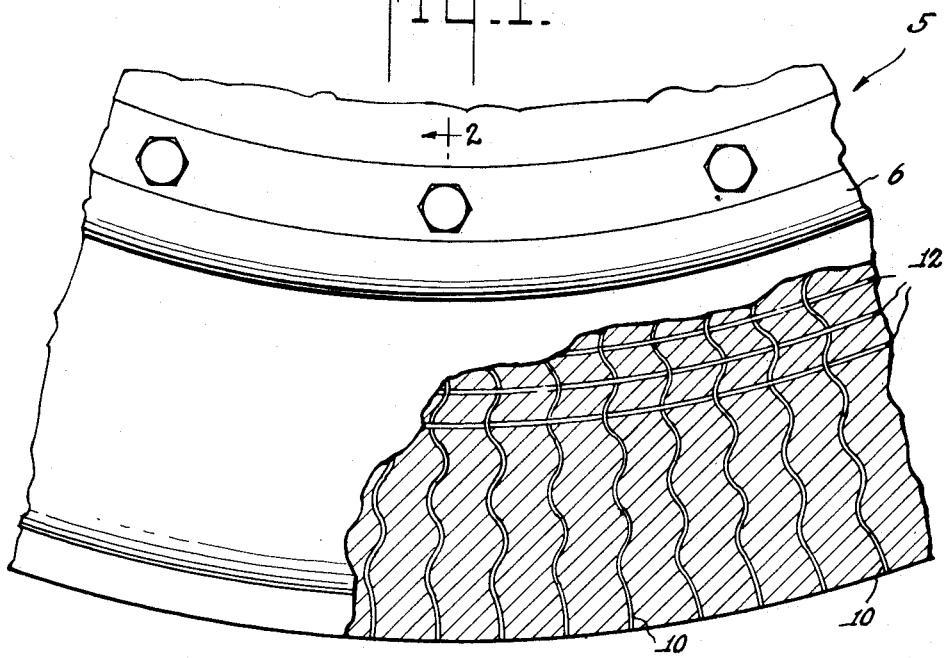
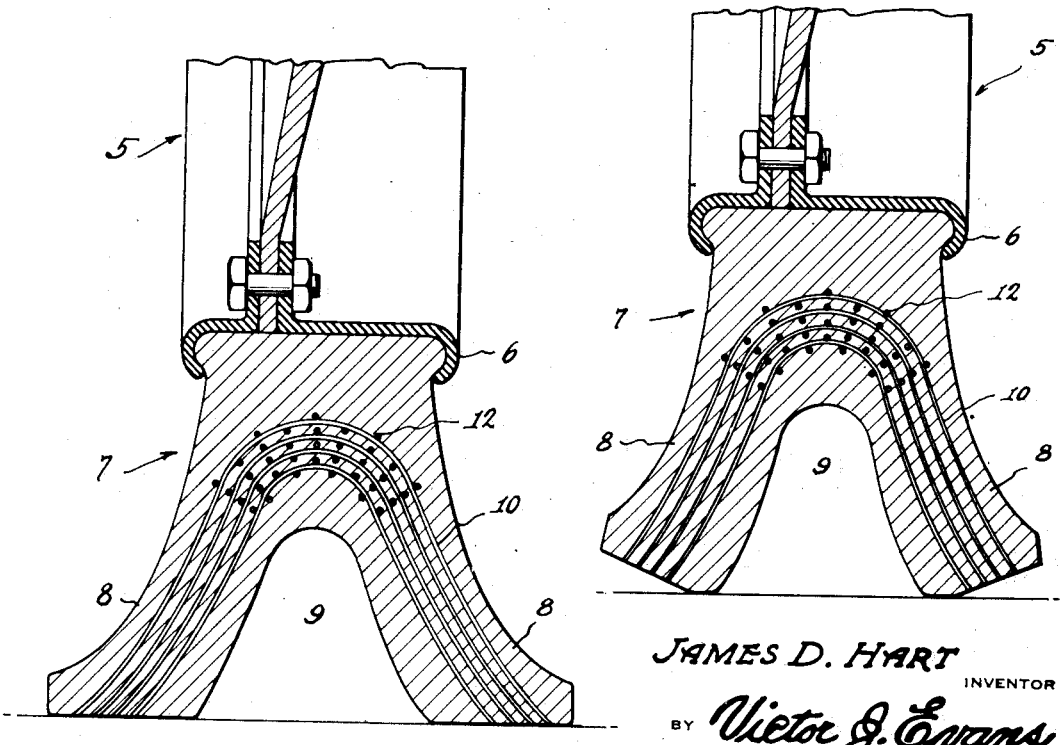
JAMES D. HART
INVENTOR
WITNESS:

Patented Nov. 8, 1932

1,887,019

UNITED STATES PATENT OFFICE

JAMES D. HART, OF STATEN ISLAND, NEW YORK

RESILIENT TIRE

Application filed September 28, 1931. Serial No. 565,680.

This invention relates to elastic tires and especially to those of the solid or non-inflated type.

One of the objects of the invention is to provide a tire having novel reinforcing means embedded therein, such means being preferably employed with a special type of tire which affords a comparatively large traction surface, increased resiliency and anti-skidding qualities.

Other objects of the invention will be appreciated from a reading of the following specification.

The invention will be fully and comprehensively understood from a consideration of the following detailed description when read in connection with the accompanying drawing which forms part of the application, with the understanding, however, that the improvement is capable of extended application and is not confined to the exact showing of the drawing nor to the precise construction described and, therefore, such changes and modifications may be made therefrom as do not affect the spirit of the invention nor exceed the scope thereof as expressed in the appended claims.

In the drawing:

Fig. 1 is a fragmentary plan view of a tire, partly in section, the same being shown as attached to a demountable rim;

Fig. 2 is a section taken approximately on the line 2—2 of Fig. 1, this view showing in cross-section the form of the tire when there is a load on the same; and Fig. 3 is a view similar to Fig. 2, but showing in cross section the form of the tire when there is a comparatively small load on the same.

Referring to the drawing for a more detailed description thereof, numeral 5 indicates a disk wheel to which is detached a demountable rim 6 carrying a solid elastic tire 7 having two threads 8 separated by a circumferential groove 9.

According to my invention reinforcing means are embedded in the tire, said reinforcing means comprising spaced transversed members 10 interwoven with circular members 12, said reinforcing members being herein shown as stout wires which give to the tire a very substantial reinforcement. Although the reinforcing members are shown in the drawing as being circular in cross-section, it is to be understood that they may have any other suitable cross-section.

The transverse reinforcing members 10 extend from the bottom of one tread to the bottom of the other and are arched intermediate their ends as shown in Figs. 2 and 3, this arching being particularly effective in providing a reinforcing structure. The mentioned transverse reinforcing members 10 are waved in the plane of the tire, as shown in Fig. 1 in order to add further reinforcing qualities to the same, these same members being provided in spaced groups, each group consisting of several spaced reinforcing members as shown in Figs. 2 and 3. It will readily be understood that the circular reinforcing means 12 which are interwoven with the transverse members 10 afford effective reinforcing means supplementing the reinforcing action of the transverse members.

What I claim as new is:

1. A solid elastic tire having two tread portions separated by a circumferential groove, and reinforcing means embedded in the tire and comprising spaced, transverse members extending from one tread to the other, and spaced circular members interwoven with the transverse members, said transverse members being waved in the plane of the tire.

2. A solid elastic tire having two tread portions separated by a circumferential groove, and reinforcing means embedded in the tire and comprising spaced, transverse members extending from one tread to the other, and spaced circular members interwoven with the transverse members, said transverse members being arched intermediate their ends and waved in the plane of the tire.

3. A solid elastic tire having two tread portions separated by a circumferential groove, and reinforcing means embedded in the tire and comprising spaced groups of spaced transverse members extending from one tread to the other, and spaced circular members interwoven with the transverse members, said transverse members being arched intermediate their ends and waved in the plane of the tire.

In testimony whereof I hereby affix my signature.

JAMES D. HART.